June 30, 1942.　　F. SWEDBERG　　2,288,496
POWER HAY STACKER
Filed Aug. 4, 1940　　3 Sheets-Sheet 3
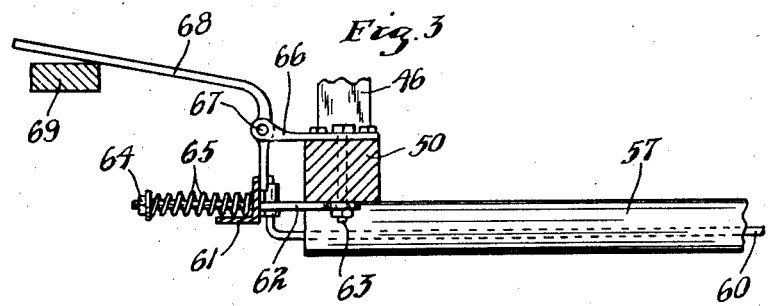
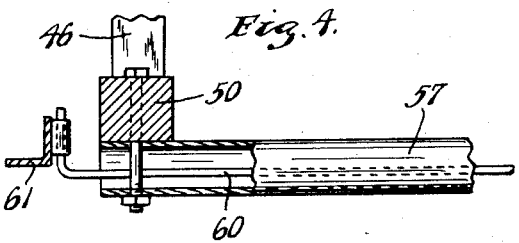
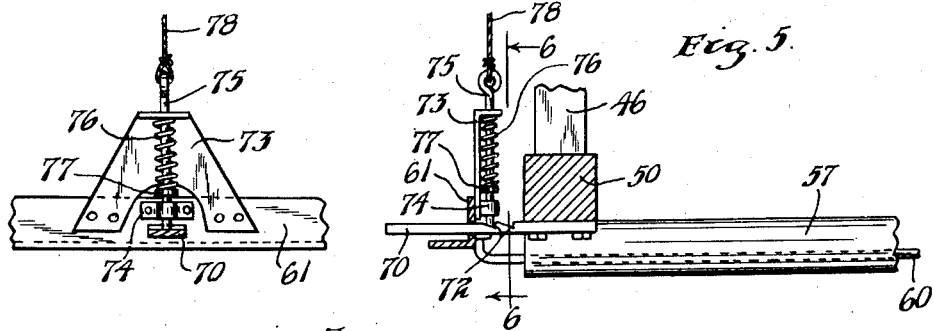
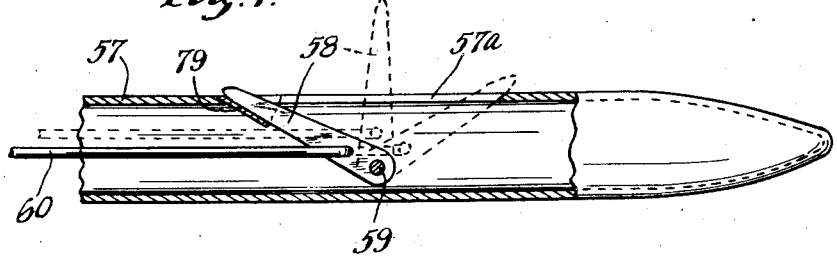
INVENTOR.
FRED SWEDBERG.
BY HIS ATTORNEYS.
Williamson & Williamson Patented June 30, 1942

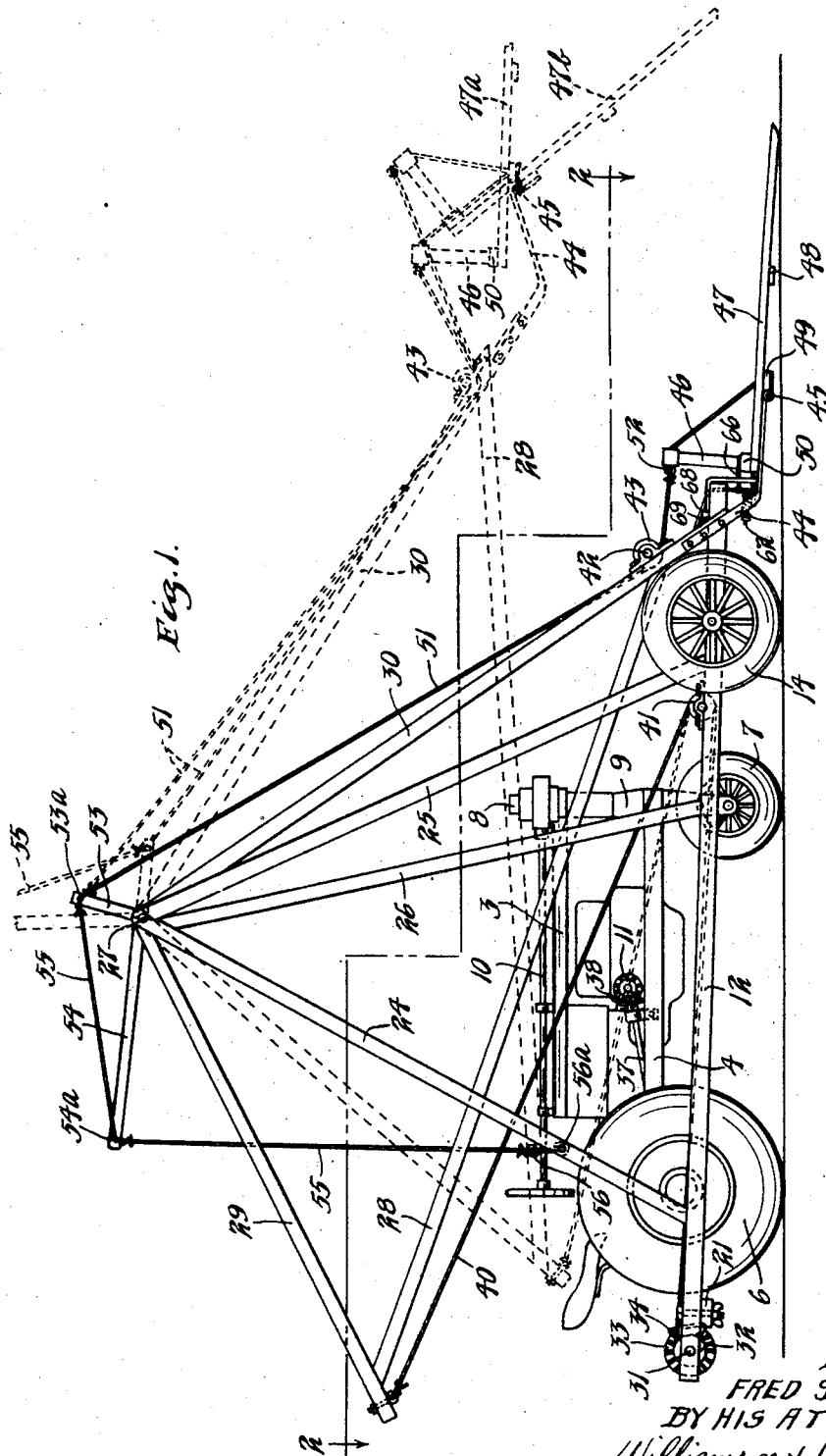

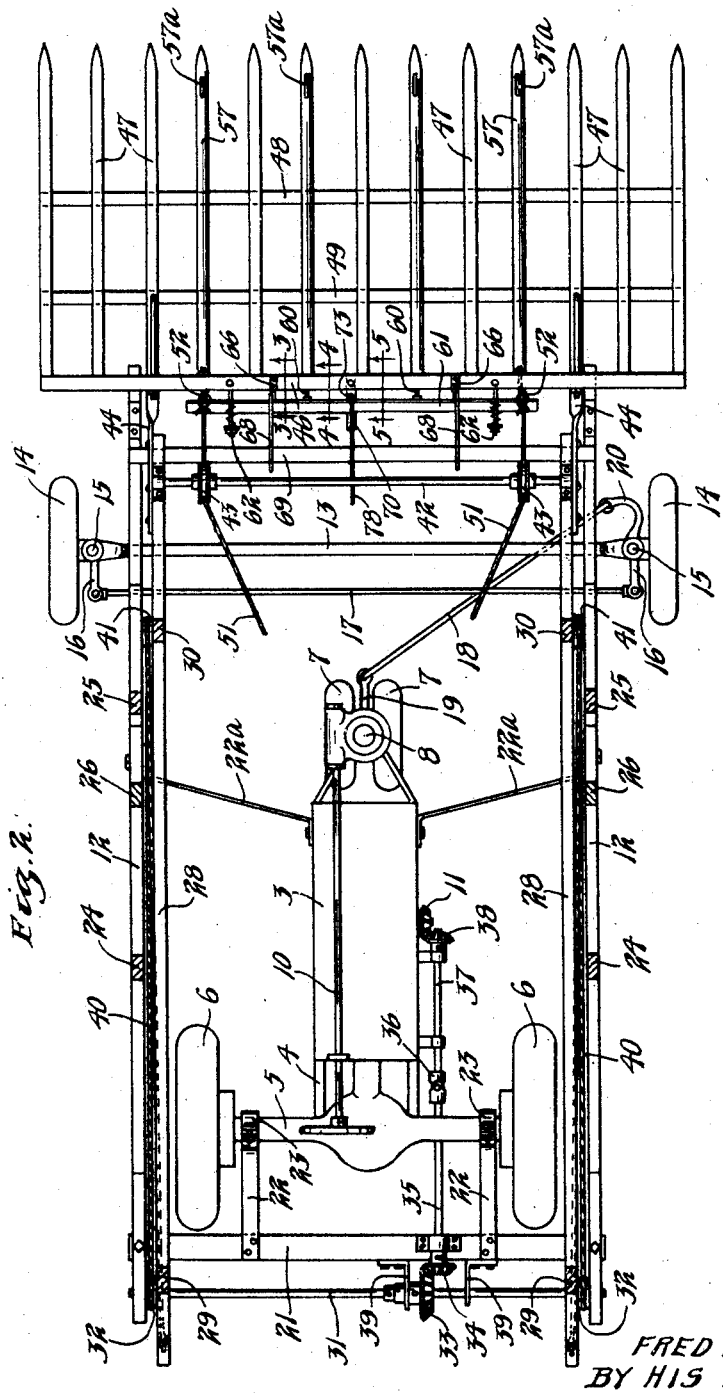

2,288,496

UNITED STATES PATENT OFFICE 2,288,496

POWER HAY STACKER

Fred Swedberg, Graceville, Minn.

Application August 4, 1940, Serial No. 351,410

1 Claim. (Cl. 214—140)

This invention relates to power rakes of a type which is particularly adapted for use in gathering hay.

There are several types of self-propelled power rakes known at the present time, but one type in common use today has at least one distinct disadvantage. In that type it is necessary for the tractor or power plant of the raking apparatus to propel the apparatus over the ground a considerable distance in order to effect elevation of the rake to a height sufficient to deposit its load upon a stack of hay. During the time the rake is running across the ground which is usually uneven a considerable quantity of hay falls therefrom and in addition should the day be windy a large amount of the hay will be blown off the rake.

It is, therefore, a general object of my invention to provide a power hay stacker in which the apparatus may be run along the ground to gather the hay upon the rake mechanism and in which said rake mechanism can be elevated in substantially a vertical direction with the remainder of the apparatus stationary with the result that the load can be elevated immediately adjacent the stack upon which it is to be deposited.

Another object of the invention is the provision of a rake structure which can be quickly and easily connected to and disconnected from a conventional farm tractor so that the tractor can be used for other purposes by the removal of a few connections with the rake mechanism.

A further object of the invention is the provision of a rake structure which is supported by wheels at its outer end and in which the wheels are connected to and steered by the steering mechanism of the tractor.

Still a further object of the invention is the provision of a rake element in which the level of the teeth of the rake is mounted substantially constant while said rake element is being elevated with a load thereon.

Still another object of the invention is the provision of simple yet efficient means for elevating the rake element.

Another object of the invention is to provide means associated with the rake tines for retaining hay upon the rake when it is being transported or elevated, said means being movable to free the hay when it is desired to dump the load.

These and other objects and advantages of the invention will more fully appear from the following description made in connection with the accompanying drawings, wherein like reference characters refer to the same or similar parts throughout the views, and, in which:

Fig. 1 is a side elevation of my improved structure connected to a tractor;

Fig. 2 is a section taken on line 2—2 of Fig. 1;

Fig. 3 is a section taken approximately on the line 3—3 of Fig. 2;

Fig. 4 is a section approximately on the line 4—4 of Fig. 2;

Fig. 5 is a section taken approximately on the line 5—5 of Fig. 2;

Fig. 6 is a section taken approximately on the line 6—6 of Fig. 5; and

Fig. 7 is an enlarged fragmentary view of the outer end of a tine equipped with a hay retainer.

As shown in the drawings the tractor comprises a hood portion 3 which houses the motor, said hood portion and motor being supported by a suitable frame 4 which is connected at its rear end to a rear axle 5 which is adapted to drive rear wheels 6. It will be noted from the location of the rear axle 5 in Fig. 1 that said axle has an off-center drive connection with the wheels, a structural arrangement which is peculiar to some types of tractors in use today. Of course, the particular type of tractor construction has no importance in this invention but is illustrative of a farm tractor of suitable type for use with my invention. The forward end of the tractor is supported by a pair of centrally located wheels 7 which are mounted on a post 8 which is rotatably mounted in a forward housing 9 and which post is rotated by suitable gearing connected to a steering shaft 10 for steering the front wheels 7. A gear 11 is shown to indicate any suitable form of power take-off from the power plant of the tractor itself.

The stacked structure includes a substantially rigid frame having side frame members 12 which are connected at their forward ends by an axle 13, the latter having mounted at its ends a pair of wheels 14 which are pivotally connected thereto on spindles 15. Short arms 16 extend rearwardly from said spindles and are connected by a connecting rod 17 so that said wheels will turn together. A link 18 connects an arm 19 which is secured to the tractor steering post 8 and the arm 20 which extends forwardly of the right-hand spindle 15. Thus when the front tractor wheels 7 are steered the same steering movement will be transmitted to the stacker frame front wheels 14 by said link 18.

The rear ends of the rigid stacker side frame members 12 are connected by a detachable cross piece 21, any suitable type of connection between the ends of the cross piece and the adjacent side frame elements being provided. A pair of straps 22 extend from the rear cross piece 21 diagonally upwardly and forwardly to the tractor rear axle assembly 5 to which they are detachably secured as by a clamp element 23. A pair of laterally extending braces 22a connect forward portions of the tractor to the side frame element 12.

Rising diagonally upwardly from adjacent the ends of each side frame is a pair of converging bracing elements 24 and 25 and it is preferred that an intermediate brace element 26 be incorporated to add strength to the assembly. Connecting the points of convergence of the upwardly extending brace elements at either side of the rigid frame construction is a cross bar 27 which securely holds the brace elements at either side of the frame in proper position. Said shaft 27 is preferably journalled at its ends in the upper ends of the converging brace members.

A movable rake supporting frame is supported by the upwardly extending brace members and the shaft 27, said frame comprising lower longitudinal elements 28 and upwardly extending converging legs 29 and 30. The upper ends of said legs 29 and 30 are pivotally supported by the shaft 27 for swinging movement of the rake support relative to the substantially rigid frame connected to the tractor.

Extending across the rear portion of the stationary form is a removably mounted rotatable shaft 31 which is suitably journalled in the ends of the stationary frame side members 12 and said shaft 31 carries a pair of drums 32 adjacent the ends thereof and the shaft is connected by means of bevel gears 33 and 34 to a forwardly extending shaft 35, the latter being detachably connected by a universal joint 36 to a short shaft section 37 which is connected in turn by a bevel gear 38 to the bevel gear 11 which is driven by the power plant of the tractor. The short shaft section 37 and bevel gear 38 may comprise a permanent part of the tractor power take-off. If desired a pair of journalled brackets 39 may aid in supporting the rear cross shaft 31 adjacent the point where the bevel gear 33 is secured upon said shaft.

Suitable cables 40 extend from said drums to the forward portion of the side frame elements 5 and lie around suitably journalled pulleys 41 from which the cables extend backwardly and upwardly to the connection between the swingable rake supporting frame elements 28 and the forwardly and upwardly extending legs 29. Thus when the cables are wound upon the drums 32 the rear portion of the rake supporting frame will be swung forwardly toward the forwardly positioned pulleys 41. Of course, it is to be understood that the power take-off of the tractor is provided with a conventional clutch mechanism to engage and disengage the winding drums 32 with respect to the power takeoff.

Extending across the forward portion of the swingable rake supporting frame is a shaft 42 whose ends are journalled in each side of said swingable frame, and said shaft carries a pair of pulleys 43 as best shown in Fig. 2. Extending forwardly from the swingable frame elements are angled brackets 44 whose forward ends are pivotally connected at 45 to the underside of a rake structure which comprises a vertical rear frame 46 and a plurality of rake teeth 47 mounted on cross pieces 48, 49, and 50. It should be noted that the pivotal connections 45 between the brackets 44 and the rake are positioned rearwardly of the centers of the rake teeth 47. Thus the rake has a normal tendency to tilt forwardly and downwardly.

A pair of cables 51 are connected at their forward lower ends to the vertical portion 46 of the rake structure by means of suitable bolts 52 which are preferably positioned at spaced points somewhere adjacent the ends of the rake. The cables 51 extend substantially directly rearwardly from the bolts 52 and beneath the pulleys 43 and thence upwardly where their upper ends are secured to the short arm 53 of an angular lever which has a long arm 54 which in the full line position shown in Fig. 1 extends rearwardly of the shaft 27 upon which an angled lever is mounted. Another cable 55 connects the point 53a on the short lever 53 with the rearward end 54a of the long lever portion and from the latter point the cable extends downwardly and has a hook 56 which is connected to any suitable stationary portion to the tractor or stationary frame structure. As best shown in Fig. 1 when the rake is in lowered position the cables 55 and 51 exert a nearly horizontal backward pull on the vertical rake portion 46 so that the rake will be securely held against forward tilting. As the rake is raised, however, the forward end of its supported frame will swing upwardly in an arc and as it swings upwardly the rake will be brought in slightly closer to the upper end of the short angled lever arm 53, said lever arm remaining relatively stationary due to the pull exerted thereon by the tendency of the rake to tilt forwardly, and since the rake has moved to a position slightly closer to the upper end of said lever arm 53, there will be some slack in the cable 51 which is taken up by tilting of the rake relative to its supporting brackets 44. In Fig. 1 the rake supporting frame is shown in partially elevated position in dotted lines and the dotted representation of a portion of a rake shown at 47a illustrates the relative pivotal movement between the rake and the brackets which support the same so that as the rake is elevated it will be maintained in a substantially horizontal position until the load has been lifted to the desired height. Thereupon the end of the cable 55 which up to this point is maintained secured by the hook 56 is released and the lever comprising the angularly disposed arms 53 and 54 will pivot forwardly on the cross shaft 27 on the upper portion of the frame work and the rake will tilt forwardly and downwardly to the position 47 shown in Fig. 1, and the load will fall from the rake to the stack upon which it is intended to be deposited. The pivot 45 connecting the brackets 44 to the rake is so located that the rake has a tendency to tilt forwardly when not restrained by the cables 51, but the unbalanced pivotal support of the rake is such that no great forward tilting tendency is present and consequently it is not necessary to exert any great pull on the vertical portion of the cable 55 in order to release said cable from the pin 56a to which the hook is normally secured. After a load has been dumped from the rake the cable 55 can be pulled downwardly by the operator of the tractor and hooked in the position shown in Fig. 1, and the rake may then be lowered to the full line position shown in Fig. 1, whereupon it is ready for use to gather up another rake load of hay or other material being harvested. Naturally as the rake supporting frame is being swung downwardly and backwardly and the rake lowered toward the ground, the ends of the cables 51 which are secured to the rake will move slightly further away from the upper end of the short lever arm 53, and when the rake has reached the ground level it will have been drawn by the cables 51 so that the rear lower portion of the rake will rest upon the relatively horizontal portions of the rake supporting brackets 44.

I have provided means associated with the rake for retaining hay thereupon when it is being elevated and transported. From the plan view in Fig. 2 it will be seen that several of the tines are slotted as at 57 at their outer ends to permit in each case a tooth 58 to project from a toothed pivot pin 59 upwardly through said tines, which, as best shown in Fig. 7, are hollow. Each of the teeth 58 has an operating rod 60 connected thereto, said rod extending back through the hollow tine to connect with an angle iron 61 which extends across the rake unit at the rear thereof. The angle iron 61 is slidably mounted upon short rods 62 which at their forward ends are connected to the rear lower cross member 50 of the rake by suitable means such as a nutted bolt 63. The rods 62 extend through the vertical web of the angle iron 61, and between said vertical web and a nut 64 on the rear end of the rod 62 is a helical spring 65. This spring normally tends to urge the angle iron 61 toward the rake lower cross member 50 and consequently urges the tooth operating rods 60 forwardly to maintain the teeth 58 in the angular dotted position shown in Fig. 7. A pair of brackets 66 are mounted on the upper side of the rake cross member 50 and are pivotally connected at 67 to a generally right-angled lever 68 whose longer arm extends rearwardly as shown in Fig. 3. When the rake is lowered the elongated arm of the angular lever 68 will engage a cross member 69 extending between forward portions of the frame side members 12, and as said lever engages the cross member 69 the short arm of the lever 68 will force the angle iron 61 and tooth operating rods 60 rearwardly to bring the teeth on said rods to the full line position shown in Fig. 7.

At the center of the transverse rake member 50 a short bar 70 is secured to said cross member at its under side and extends rearwardly thereof through a suitable aperture in the angle iron 61. The bar 70 is provided with notches 72 which, as best shown in Fig. 5, have rearwardly and upwardly slanting portions and forward vertical portions. Mounted immediately above the bar 70 and connected to the angle iron 61 is a bracket 73 which in conjunction with a guide 74 vertically supports and slidably guides a latch member 75. The latch 75 carries a helical spring 76 which is compressed between an angularly bent portion of bracket 73 and a collar 77 adjacent the lower end of the latch 75. Thus the latch is normally urged downwardly.

When the rake is down and has been loaded the teeth 58 are in the full line position shown in Fig. 7 due to the fact that the action of the angular lever 68 against the cross member 69. When it is desired to shift the teeth to the vertical position shown in dotted lines in Fig. 7, the latch 75 is pulled upwardly by means of a suitable cable or rope 78 which preferably leads to a position adjacent the tractor controls and the rake is elevated slightly to remove the angular lever 68 from contact with the cross lever 69. This will permit each of the springs 65 to urge the angle iron 61 forwardly and upon release of the cable 68 permit the latch 75 to drop in the right-hand notch of the bar 70 shown in Fig. 5. This slight movement of the angle iron 61 in a forward direction will similarly move the tooth operating rods 60 forwardly and bring each of the teeth to a vertical position. Thus the teeth will retain the hay against forward sliding movement off of the ends of the tines.

After the load has been transported and elevated and is ready for dumping the latch cable 78 is again pulled to release the latch 75 from the notched bar 70, and the angle iron 61, tooth operating rods 60 and teeth 58 will again move forwardly to bring the teeth to the forwardly inclined position shown in dotted lines in Fig. 7.

It is preferred that a seat 79 be formed in each of the slots 57 in the hollow tines which carry the teeth 58 to provide rests for the ends of the teeth 58 and also to some extent prevent straw or hay from getting into the tines through the openings 57.

From the foregoing description it will be seen that I have provided a rigid rake supporting structure which can be quickly and easily secured to a conventional type of tractor such as is commonly used on the farm and can be just as easily disconnected from said tractor so that the latter can be put to other uses on the farm. The removable rear cross piece 21 and the removable drum carrying shaft 31 adjacent said cross piece permit the tractor to be driven into or out of the frame and no great amount of lifting of the rake supporting frame is required. In addition the structure can be easily maneuvered since the rear end of the frame is secured to the tractor and supported thereby and the forward end thereof is supported by steered wheels, the movements of which are controlled by the steering of the front tractor wheels. Thus the apparatus can be stopped within a very short distance of the stack upon which the load is to to be deposited and the rake elevated and tilted to deposit the load upon the stack without running a long distance over the ground to accomplish elevation of the rake as is common to most other power rake structures. The device is relatively simple in construction and the relationship of the angled lever composed of the arms 53 and 54 to the position of the rake in its lowered intermediate and elevated positions provides for maintenance of the rake in a horizontal position during elevation thereof, as has been above described.

It will, of course, be understood that various changes may be made in the form, details, arrangement and proportions of the various parts without departing from the scope of my invention.

What is claimed is:

1. In a hay rake and stacker, a main frame having an abutment member at its front end, a rake unit comprising a cross frame portion mounted for movement relative to said main frame abutment member, tines extending forwardly from said cross frame portion, teeth pivotally mounted on said tines and swingable upwardly from said tines or downwardly substantially flush therewith, tooth operating means connected to said teeth and adapted to contact said main frame abutment in one position of said movable cross frame member, said tooth operating means including means for swinging said teeth upon movement of said rake cross frame relative to said main frame abutment.

FRED SWEDBERG.